(12) United States Patent
Wang et al.

(10) Patent No.: US 10,243,663 B2
(45) Date of Patent: *Mar. 26, 2019

(54) SYSTEMS AND METHODS FOR BIASING OPTICAL MODULATING DEVICES

(71) Applicant: INPHI CORPORATION, Santa Clara, CA (US)

(72) Inventors: Shih Cheng Wang, Cupertino, CA (US); Jinwoo Cho, Palo Alto, CA (US); Shu Hao Fan, Sunnyvale, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/980,448

(22) Filed: May 15, 2018

(65) Prior Publication Data
US 2018/0269978 A1 Sep. 20, 2018

Related U.S. Application Data

(63) Continuation of application No. 15/342,855, filed on Nov. 3, 2016, now Pat. No. 9,998,228, which is a continuation of application No. 14/316,566, filed on Jun. 26, 2014, now Pat. No. 9,496,962.

(60) Provisional application No. 61/840,260, filed on Jun. 27, 2013, provisional application No. 61/953,531, filed on Mar. 14, 2014.

(51) Int. Cl.
H04B 10/50 (2013.01)

(52) U.S. Cl.
CPC ... H04B 10/50575 (2013.01); H04B 10/5053 (2013.01)

(58) Field of Classification Search
None
See application file for complete search history.

(56) References Cited

U.S. PATENT DOCUMENTS

| 6,782,211 B1 | 8/2004 | Core |
| 7,729,621 B2 | 6/2010 | Nahapetian et al. |
| 8,103,173 B2 | 1/2012 | Schemmann et al. |
| 8,761,609 B1 | 6/2014 | Agazzi et al. |
| 9,496,962 B1 | 11/2016 | Wang et al. |
| 2007/0212075 A1 | 9/2007 | Yin |
| 2009/0103924 A1 | 4/2009 | Kawanishi et al. |
| 2011/0206384 A1 | 8/2011 | Zhou et al. |
| 2011/0235971 A1 | 9/2011 | Hashimoto |
| 2012/0051756 A1 | 3/2012 | Grobe |
| 2012/0134620 A1 | 5/2012 | Yamaji et al. |
| 2012/0251104 A1 | 10/2012 | Oberland |

Primary Examiner — Casey L Kretzer
(74) Attorney, Agent, or Firm — Richard T. Ogawa; Ogawa P.C.

(57) ABSTRACT

Systems and methods described herein include methods and systems for controlling bias voltage provided to an optical modulating device. The optical modulating device is biased at a bias point that is different from a null point of the device such that an offset to the received optical power due to limited extinction ratio is reduced.

20 Claims, 10 Drawing Sheets

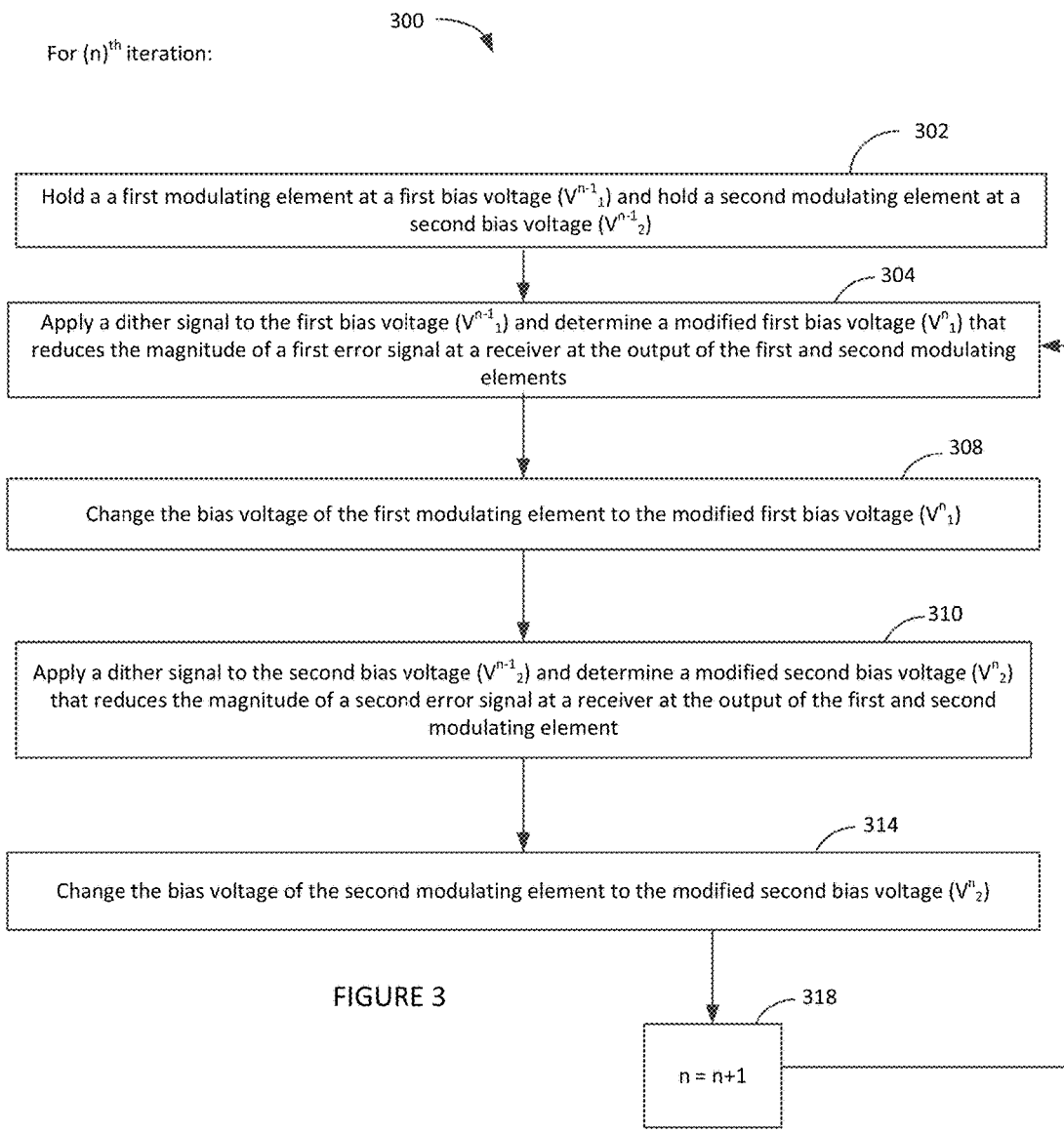

For (n)ᵗʰ iteration:

302 — Hold a a first modulating element at a first bias voltage ($V^{n-1}_1$) and hold a second modulating element at a second bias voltage ($V^{n-1}_2$)

304 — Apply a dither signal to the first bias voltage ($V^{n-1}_1$) and determine a modified first bias voltage ($V^n_1$) that reduces the magnitude of a first error signal at a receiver at the output of the first and second modulating elements 308 — Change the bias voltage of the first modulating element to the modified first bias voltage ($V^n_1$)

310 — Apply a dither signal to the second bias voltage ($V^{n-1}_2$) and determine a modified second bias voltage ($V^n_2$) that reduces the magnitude of a second error signal at a receiver at the output of the first and second modulating element 314 — Change the bias voltage of the second modulating element to the modified second bias voltage ($V^n_2$)

SYSTEMS AND METHODS FOR BIASING OPTICAL MODULATING DEVICES

CROSS-REFERENCE TO RELATED APPLICATIONS

This application is a continuation of U.S. application Ser. No. 15/342,855 filed Nov. 3, 2016, which is a continuation of U.S. application Ser. No. 14/316,566, filed Jun. 26, 2014 (now U.S. Pat. No. 9,496,962 issued Nov. 15, 2016), titled "SYSTEMS AND METHODS FOR BIASING OPTICAL MODULATING DEVICES," which claims the benefit of priority under 35 U.S.C. § 119(e) of U.S. Provisional Patent Application No. 61/840,260, filed on Jun. 27, 2013, titled "AUTOMATIC MODULATOR BIAS CONTROL FOR SPECTRALLY EFFICIENT OPTICAL MODULATION FORMAT" and U.S. Provisional Patent Application No. 61/953,531, filed on Mar. 14, 2014, titled "SYSTEMS AND METHODS FOR BIASING OPTICAL MODULATING DEVICE," each of which are herein incorporated by reference in their entirety.

BACKGROUND

Field of the Invention

This disclosure relates to modulating devices for optical communication.

Description of the Related Art

The growth in social networking, e-commerce, cloud computing, data streaming, etc. is causing an explosive growth in global data traffic. Handling this growth requires high capacity networks that can carry a large amount of data traffic over large distances while maintaining signal quality. One way to handle such growth is through the use of optical communication systems operating at relatively high data rates, including data rates beyond 1.0 Gbits/s, for example 2.5 Gbits/s, 10 Gbits/s, 20 Gbits/s. 40 Gbits/s, 100 Gbits/s, 128 Gbits/s, and 256 Gbits/s. Increased data rates can be achieved by direct optical modulation, dense wavelength division multiplexing (DWDM), optical frequency division multiplexing (OFDM) or other methods. Existing optical communication systems typically rely on some form of on/offkeying (OOK) as a modulation format, such as, for example, non-return to zero (NRZ) or return-to-zero (RZ) modulation formats. Spectral inefficiencies in existing systems can lead to undesirable effects including interference between channels. There is a need for optical communication systems having improved spectral efficiency.

SUMMARY

The systems, methods and devices of the disclosure each have several innovative aspects, no single one of which is solely responsible for the desirable attributes disclosed herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Example implementations disclosed herein are illustrated in the accompanying schematic drawings, which are for illustrative purposes only.

FIG. 3 is a flowchart that illustrates an embodiment of a method of determining a target biasing point of an optical modulating device.

Like reference numbers and designations in the various drawings indicate like elements.

DETAILED DESCRIPTION

Various implementations of systems and methods disclosed herein are configured to bias an optical modulating device at a target bias voltage that is different from the null point (or the quad point) of the optical modulating device. The target bias voltage can be determined through the use of a dither signal. For example, an implementation of a method of determining the target bias voltage includes (i) biasing the optical modulating device at a null point; (ii) applying a dither signal to the applied bias voltage; and (iii) adjusting the applied bias voltage such that the magnitude of the response of the optical modulating device to the dither signal at the fundamental frequency (i.e. frequency close to the baseband) is reduced. To arrive at the target bias voltage, this method can be performed iteratively until the magnitude of the response of the optical modulating device to the dither signal at the fundamental frequency is minimized or sufficiently reduced. Biasing an optical modulating device at a target bias voltage that is different from the null point (or quad) point can be advantageous in achieving a desired extinction ratio (e.g., greater than or equal to 20 dB). One benefit that is achieved through the incorporation of such techniques in optical communication systems is improved spectral efficiency. While such techniques can be employed in a variety of systems, some example optical communication transceivers incorporating those devices can be found in U.S. Pat. No. 8,761,609, which is hereby incorporated by reference in its entirety herein.

Example Optical Modulating Device

Figure 1A:
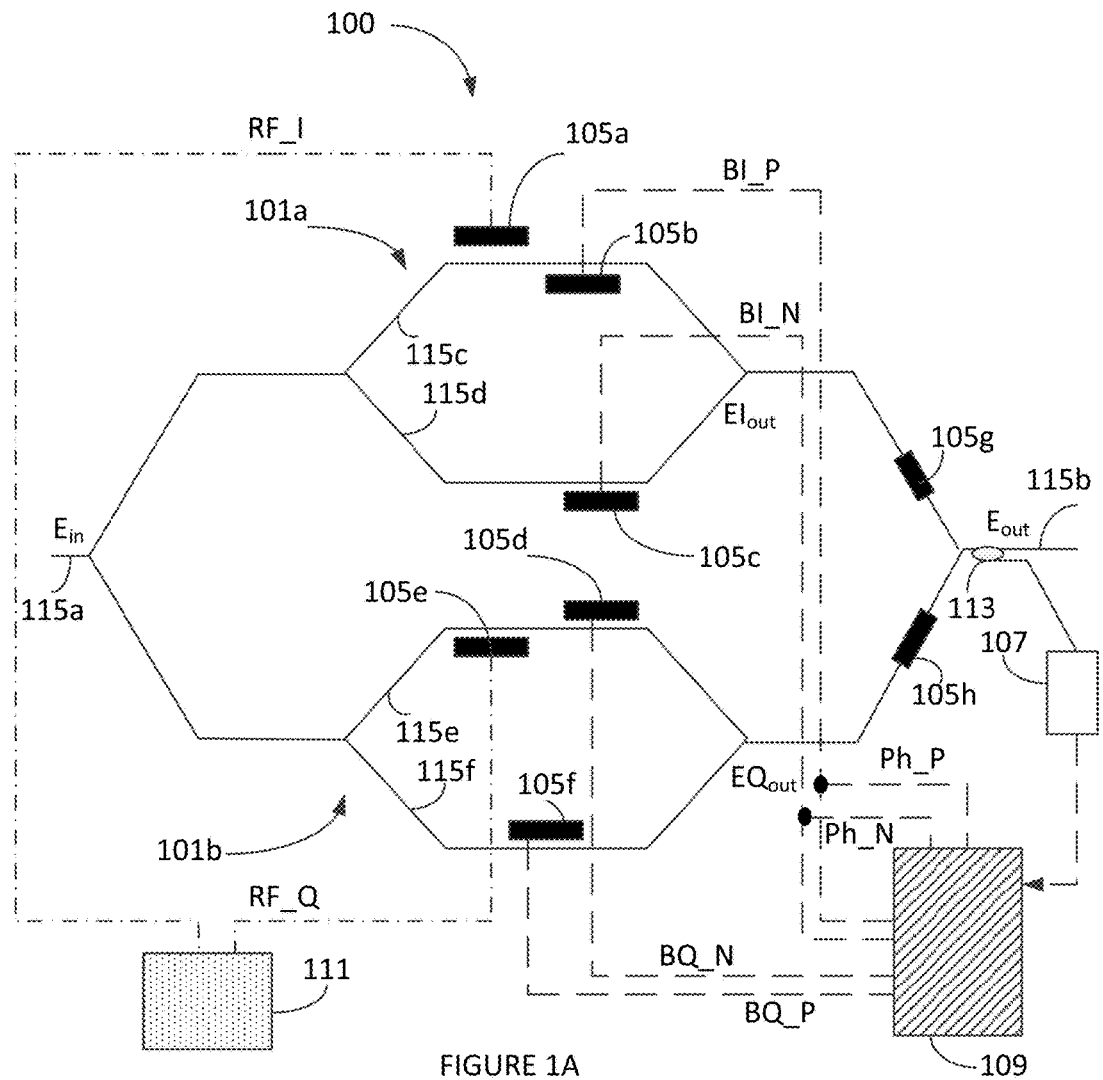
FIG. 1A illustrates an example implementation of an optical modulating device including a pair of modulating elements that can be employed to generate a spectrally efficient optical signal.

FIG. 1A illustrates an example implementation of an optical modulating device 100 including a pair of modulating elements 101a and 101b that can be employed to generate spectrally efficient optical signals. The optical modulating device 100 includes electrodes 105a, 105b, 105c, 105d, 105e, 105f, 105g and 105h that are capable of receiving DC and/or RF electrical signals from a data driver 111 and a bias controller 109.

The data driver 111 is configured to drive the optical modulating device 100. The data driver 111 can output data signals with a relatively high data rate. For instance, depending on the embodiment, the data driver 111 can output an RF data signal with a data rate of about 1 Gbits/s, about 2.5 Gbits/s, about 10 Gbits/s, about 20 Gbits/s, about 40 Gbits/s, about 100 Gbits/s, or data rates between any of these values. In some cases, higher data rates are achieved, such as data rates between about 100 Gbits/s and about 256 Gbits/s. In one embodiment, the data driver 111 is implemented as an integrated circuit including one or more of RF amplifiers, RF gain controllers, operational amplifiers, analog-to-digital circuits and digital-to-analog circuits. The data driver 111 can be a part of a larger subsystem, such as, for example, a router, a switch or a multiplexer.

The bias controller 109 is configured to bias the modulating elements 101a and 101b, e.g., by providing and/or controlling bias voltages. For instance, the bias controller 109 can be configured to automatically control the bias voltages provided to the modulating elements 101a and 101b. Further details regarding example bias controllers 109 are provided herein, e.g., with respect to FIG. 4A.

The bias controller 109 can be a part of a feedback loop including an optical receiver 107 that is optically connected to the optical modulating device 100 via an optical tap 113. The optical tap 113 can be configured to direct between about 2% to about 20% of the total optical power output from the optical modulating device 100 to the receiver 107. The optical tap 113 can be a fiber-optic coupler or a waveguide coupler.

The optical modulating device 100 includes an input optical waveguide 115a through which an input light beam enters the optical modulating device 100 and an output waveguide 115b through which a modulated light beam exits the optical modulating device 100. In various implementations, the optical input optical waveguide 115a and/or the output optical waveguide 115b can be coupled to one or more optical fibers (not shown). The modulating element 101a includes a pair of optical waveguides 115c and 115d. The modulating element 101b includes a pair of optical waveguides 115e and 115f. The waveguides 115a-115e can be implemented in some embodiments by diffusing dopants (e.g., Ti) into portions of the electro-optic material or by an annealed proton exchange (APE) process.

The optical modulating device 100 can be configured to generate optical signals encoded with advanced modulation formats such as, for example, quadrature phase shift keying (QPSK), differential quadrature phase shift keying (DQPSK), 4-level pulse amplitude modulation (PAM-4), 8-level pulse amplitude modulation (PAM-8), 16-level pulse amplitude modulation (PAM-16), 32-level pulse amplitude modulation (PAM-32), duobinary, etc. Various implementations of the optical modulating device 100 can be used in coherent optical communication. In such systems, the optical modulating device 100 can be used to generate optical signals with spectrally efficient modulation formats that have more than 2 bits per symbol. The optical signals generated by the optical modulating device 100 can have spectral efficiency greater than 1.0 b/s/Hz. For example, depending on the implementation, the optical signals generated by the optical modulating device 100 can have spectral efficiency greater than or equal to about 0.4 b/s/Hz, 0.8 b/s/Hz, 1.0 b/s/Hz or greater than or equal to 2.0 bits/s/Hz but less than or equal to about 10.0 b/s/Hz, about 8.0 b/s/Hz, about 6.0 b/s/Hz, or about 4.0 b/s/Hz.

For optical signals encoded with OOK modulation format, data is transmitted using two levels of optical power, where the higher optical power represents the "on" state or binary 1 and the lower optical power represents the "off" state or binary 0. The extinction ratio (ER) for such systems is given by the ratio of the higher optical power to the lower optical power. If the lower optical power is zero, then ER is infinite. It is advantageous for optical signals to have a high ER since it can reduce the errors associated with receiving and detecting a bit or a symbol. For example, in a PAM-4 modulated signal, voltage levels 1, ⅓, −⅓ and −1 can be used to represent the symbols 11, 10, 01 and 00. If ER is low, then the difference between the voltage levels representing the symbols 11, 10, 01 and 00 is also low. Accordingly, the probability of an error in detecting a symbol increases. A reduction in ER also increases the average optical power that is sufficient for an optical receiver to maintain a certain bit-error rate ratio (BER). Moreover, a reduction in ER is associated with a DC offset in the optical receiver which can cause overload problems in the optical receiver. It can be desirable for optical signals to have an ER greater than about 10 dB, for example. Depending on the embodiment, the systems and methods described enable the optical modulating device 100 to generate optical signals that have equivalent ER from its intrinsic ER to arbitrarily high ER, such as, for example about 10 dB, about 15 dB, about 20 dB, about 30 dB, about 40 dB, about 50 dB, about 60 dB, about 70 dB, about 80 dB, about 90 dB, about 100 dB, ER's between any of these values, or greater.

Referring to FIG. 1A, in various implementations, the pair of modulating elements 101a and 101b can be an electro-optic modulator including an electro-optic material (e.g., Lithium Niobate (LiNbO$_3$)) that modulates the intensity, phase, frequency or polarization of a light beam propagating through the electro-optic modulator. Without subscribing to any particular theory, application of an electrical signal (e.g., an electrical voltage or an electrical current) causes a change in the refractive index of the electro-optic material. This change in the refractive index causes a corresponding change in at least one of a phase, frequency or polarization of a light beam propagating through the electro-optic material. This effect can be used to modulate the intensity, phase, frequency or polarization of a light beam propagating through the electro-optic modulator.

Figure 1B:
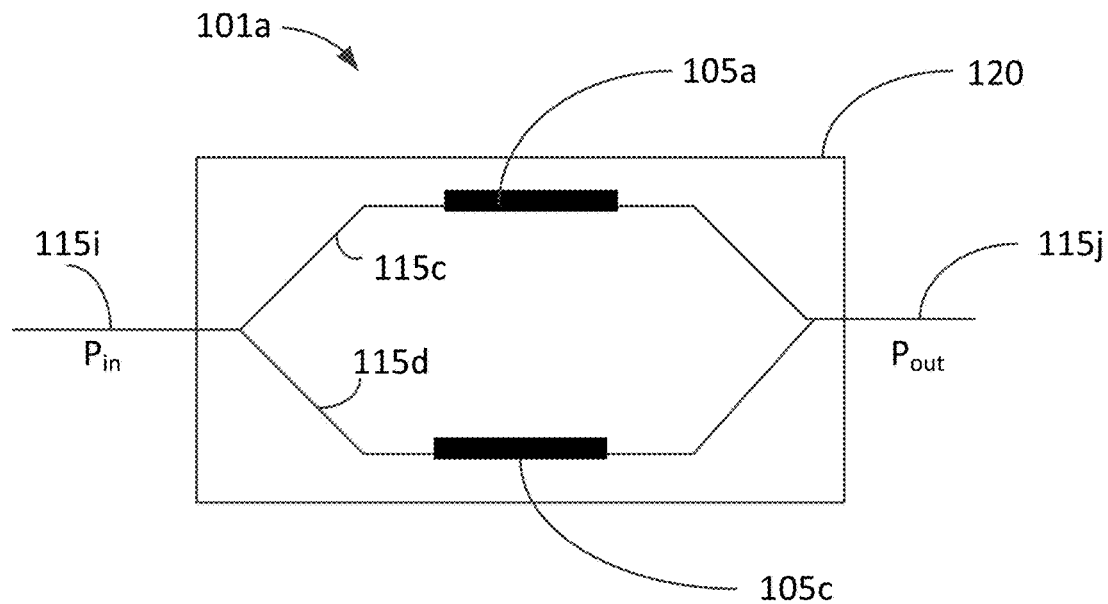
FIG. 1B is an implementation of an optical modulating element configured as a Mach-Zehnder modulator.

One way of modulating the intensity, phase, frequency or polarization of a light beam is a Mach-Zehnder modulator (MZM) which is based on a Mach-Zehnder interferometer. FIG. 1B illustrates an implementation of the modulating element 101a configured as a MZM. The MZM modulating element 101a includes an electro-optic material 120 such as, for example, Lithium Niobate (LiNbO$_3$), including waveguides 115c and 115d. Electrode 105a is disposed with respect to the waveguide 115c and electrode 115d is disposed with respect to waveguide 115d. Incoming unmodulated light, such as, for example, a continuous wave (CW)

laser with input optical power Pin propagating along input waveguide 115i is divided into a first light beam propagating through the waveguide 115c and a second light beam propagating through the waveguide 115d. The phase of the first and second light beams can be individually changed by applying a direct current (DC) or a radio frequency (RF) electrical signal to the electrodes 105a and 105c. The first and second light beams are interferometrically combined and output through the output waveguide 115j. The output optical power $P_{out}$ varies based on the amount of phase difference between the first and second light beams when interferometrically combined. For example, if the electrical signals applied to the electrodes 105a and 105b are such that the amount of phase difference between the first and second light beams is 0 or an integral multiple of $2\pi$, then first and second light beams interfere constructively such that the output power is at a high level (P1). If electrical signals applied to the electrodes 105a and 105b are such that the amount of phase difference between the first and second light beams is an odd integer multiple of $\pi$ then first and second light beams interfere destructively such that the output power is at a low level (P0). The ER of the output optical signal is (P1/P0).

Figure 1C:
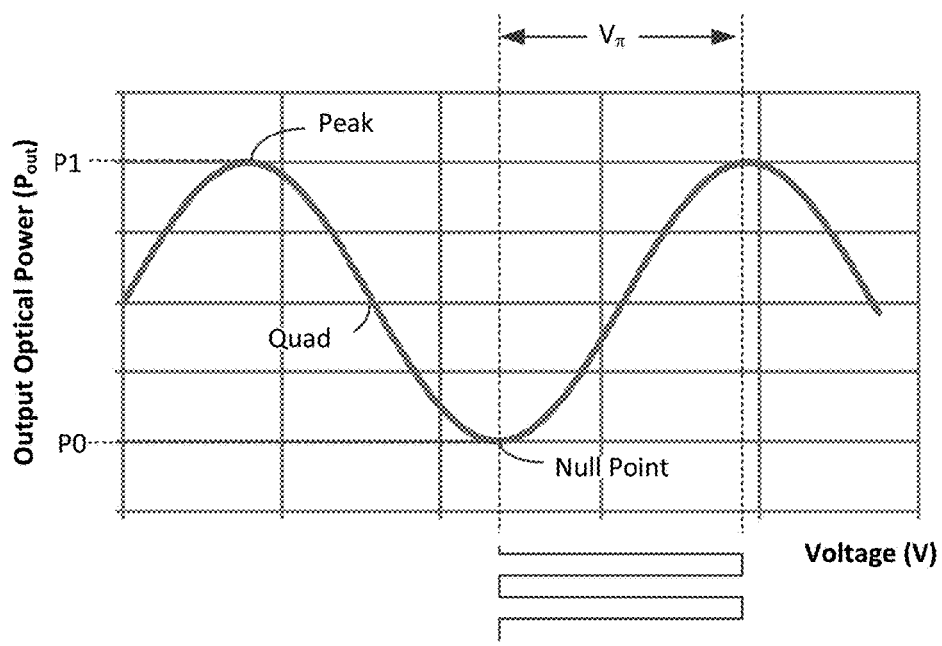
FIG. 1C is a power transfer function of an implementation of an optical modulating element configured as a Mach-Zehnder modulator.

The variation in the output optical power ($P_{out}$) as a function of the electrical voltage applied to one of the electrodes 105a and 105c, also referred to as power transfer function, is shown in FIG. 1C. As noted, the output optical power ($P_{out}$) varies between a high level P1 and a low level P0 as the voltage applied to one of the electrodes 105a and 105c is increased. Without any loss of generality, the low level P0 can correspond to a minima of the power transfer function and the high level P1 can correspond to a maxima of the power transfer function. The voltage required to introduce a phase shift equal to $\pi$ between the first and second light beams is referred to as $V_\pi$. For instance, the voltage $V_\pi$ is equal to the voltage required to change the output optical power from a low power to a high power or vice versa. The voltage level corresponding to the low level P0 is referred to as the null point and the voltage level corresponding to the high level P1 is referred to as the peak. The voltage level mid-way between the peak and the null point is referred to as quad point.

In some implementations, to modulate a CW optical signal, the MZM modulator 101a is biased at the quad point by applying a DC voltage that corresponds to the quad point to one of the electrodes (e.g., 105c) and applying a RF data signal with amplitude equal to $V_\pi$ to the other electrode (e.g., 105a) such that output optical power varies between a high level P1 and a low level P0 at the frequency of the RF data signal.

In some implementations, to modulate a CW optical signal, the MZM modulator 101a is biased at the null point by applying a DC voltage that corresponds to the null point to one of the electrodes (e.g., 105c) and applying a RF data signal with amplitude equal to $2V_\pi$ to the other electrode (e.g., 105a) such that output optical power varies between a high level P1 and a low level P0 at the frequency of the RF data signal.

The power transfer function of the MZM modulator 101a may drift (e.g., to the left or right) due to temperature changes or aging. This may degrade the quality of the modulated optical signal.

The optical modulating device 100 can be configured to generate spectrally efficient optical signals having advanced modulation formats. For example, a dual-polarization MZM can be biased at voltage levels different from the null point (or the quad point). In various implementations, the bias voltage can be selected to achieve a certain desired ER. The bias voltage can depend on the ER provided by the modulating elements 101a and 101b. Systems and methods disclosed herein generate voltages that bias the modulating elements 101a and 101b of the optical modulating device 100 at voltage levels different from the null point (or the quad point) such that the ER of the output optical signal is increased or maximized.

In various implementations, the optical modulating device 100 can be configured as an I-Q modulator that modulates the in-phase component (I) and the quadrature (Q) component of the optical signal. Without any loss of generality, the in-phase component (I) of the optical signal corresponds to the real part of the signal and the quadrature (Q) component of the optical signal corresponds to the imaginary part of the optical signal.

Referring to the implementation illustrated in FIG. 1A, the optical modulating device 100 is a twoport device that modulates both phase and amplitude of the incoming optical signal. The optical modulating device 100 is configured as a single-polarization I-Q MZM that modulates an incoming optical signal having an electric field $E_{in}$. The modulated optical signal has an electric field $E_{out}$. The modulating element 101a is configured to modulate the in-phase component (I) of the incoming optical signal and the modulating element 101b is configured to modulate the quadrature component (Q) of the incoming optical signal. The optical signal at the output of the modulating element 101a has an electric field $EI_{out}$ and the optical signal at the output of the modulating element 101a has an electric field $EQ_{out}$. The electric fields $E_{in}$, $E_{out}$, $EI_{out}$, and $EQ_{out}$ each have a real component and an imaginary component. Without any loss of generality, the electric field strength $E_{out}$ can be a vector sum of the electric field strength $EI_{out}$ and $EQ_{out}$. The biasing scheme for one polarization state of the optical carrier is shown in FIG. 1A and is used when the optical modulating device 100 is configured as a single-polarization I-Q MZM. In some implementations, the optical modulating device 100 can include a second pair of modulating elements similar to the pair of modulating elements 101a and 101b such that it functions as a dual-polarization I-Q MZM. In such implementations, the biasing scheme for the second polarization state (e.g., the orthogonal polarization state) can be the same as shown in FIG. 1A.

The RF data signal (RF_I) to modulate the in-phase component (I) of the optical signal is applied to electrode 105a and the RF data signal (RF_Q) to modulate the quadrature component (Q) of the optical signal is applied to electrode 105e. Accordingly, the electrodes 105a and 105e can be configured to receive high bit-rate signals (e.g., at data rates of about 1 Gbits/s, about 2.5 Gbits/s, about 10 Gbits/s, about 20 Gbits/s, about 40 Gbits/s, about 100 Gbits/s, or data rates between these values, or higher). The RF data signals RF_I and RF_Q can be generated by the data driver 111, for example. In some embodiments, the RF data signals, RF_I and RF_Q, can be single ended with AC coupling. Or in other cases the RF data signals RF_I and RF_Q can be differential including a p-channel and an n-channel, e.g., with the p-channel and the n-channel being equal in amplitude but opposite in sign.

In the biasing scheme shown in FIG. 1A, the modulating element 101a is biased by applying a bias voltage BI_P to the electrode 105b and a bias voltage BI_N to the electrode 105c and the modulating element 101b is biased by applying a bias voltage BQ_P to electrode 105d and a bias voltage BQ_N to the electrode 105f. The electrodes 105b and 105d can be referred to as positive bias ports and the electrodes 105c and 105f can be referred to as negative bias ports. The bias voltages BI_P, BI_N, BQ_P and BQ_N can be a DC voltage or a low frequency electrical signal whose amplitude varies about a DC voltage. In various implementations, the bias voltage BI_P and BI_N can be 90-degrees out-of-phase with each other. The bias voltage BQ_P and BQ_N can additionally be 90-degrees out-of-phase with each other.

The optical modulating device 100 can include bias electrodes 105g and 105h disposed on the waveguides at the output of the modulating elements 101a and 101b respectively. A voltage can be applied to the electrodes 105g and electrodes 105h to adjust the phase difference between the I-modulated signal and the Q-modulated signal. For example, the optical modulating device 100 can be biased at the quadrature. When biased at the quadrature, the voltage applied to the electrodes 105g and 105h can be adjusted so that the phase difference between the I-modulated and the Q-modulated signals have a phase difference of 90 degrees.

Figure 4A:
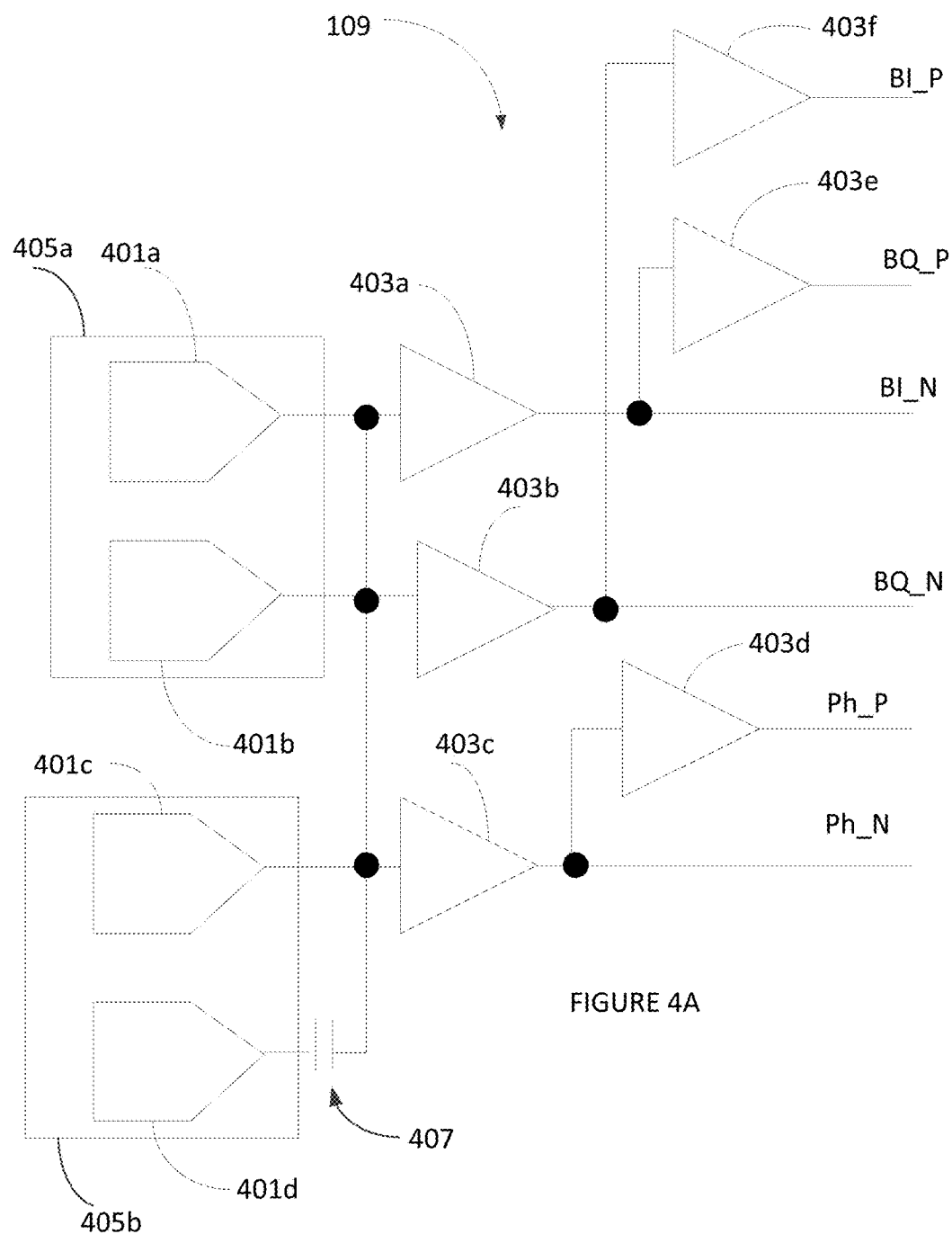
FIG. 4A illustrates an example implementation of a bias controller that can be employed to generate bias voltages applied to the modulating elements of the optical modulating device.

The bias voltages BI_P, BI_N, BQ_P, and BQ_N can be generated by the bias controller 109, which can be integrated with the optical modulating device 100. In some other implementations, the bias controller 109 is separate from the optical modulating device 100 and adapted to be electrically and/or optically connected to the optical modulating device 100. The bias controller 109 can include one or more of digital to analog converters (DACs), operational amplifiers, unity gain operational amplifiers, detectors and filters, microprocessors, microcontrollers, digital signal processors (DSPs), field programmable gate arrays (FPGAs), memory, flash memory, random access memory (RAM), read only memory (ROM), non-transitory storage medium to store machine-readable instructions, comparators, differentiators, limiters, amplifiers, capacitors, etc. An implementation of the bias controller 109 is illustrated in FIG. 4A and explained in detail below.

The un-modulated signal from the modulating element 101b can manifest as a DC component of the modulated output from the modulating element 101a and vice-versa. In a dual-polarization modulation scheme, there could be coupling between the outputs from the modulating elements configured to modulate a first polarization and the outputs from the modulating elements configured to modulate a second polarization. These couplings between the modulating elements can decrease the ER of the output from the optical modulating device 100 as discussed below with reference to FIG. 2.

With reference to FIG. 1A, the electric field at the receiver 107 at the output of the optical modulating device 100 can be represented as $E_{out}$. The phase difference between light propagating through the waveguide 115c and the waveguide 115d when bias voltages BI_P and BI_N are applied to the modulating element 101a is represented as $\phi_{BI}$. The phase difference between light propagating through the waveguide 115e and the waveguide 115f when bias voltages BQ_P and BQ_N are applied to the modulating element 101b is represented as $\phi_{BQ}$. In various implementations, the phase difference $\phi_{BI}=(BI\_P-BI\_N)/V\pi$ and the phase difference $\phi_{BQ}=(BI\_Q-BI\_Q)/V\pi$. The ratio of the data signal RF_I to $V\pi$ is represented as $\phi_{RF\_I}$ and the ratio of the data signal RF_Q to $V\pi$ is represented as $\phi_{RF\_Q}$. The difference between $\phi_{BI}$ and $\pi$ is represented as $\Delta\phi_{BI}$. The difference between $\phi_{BQ}$ and $\pi$ is represented as $\Delta\phi_{BQ}$. The maximum and minimum output optical power of the modulating element 101a is represented as $PI_{max}$ and $PI_{min}$. The maximum and minimum output optical power of the modulating element 101b is represented as $PQ_{max}$ and $PQ_{min}$. The ER of the modulating element 101a is equal to $PI_{max}/PI_{min}$. The ER of the modulating element 101a is equal to $PQ_{max}/PQ_{min}$. When the optical modulating device 100 is biased at the null point, $\phi_{BI}=\phi_{BQ}=\pi$.

Figure 2:
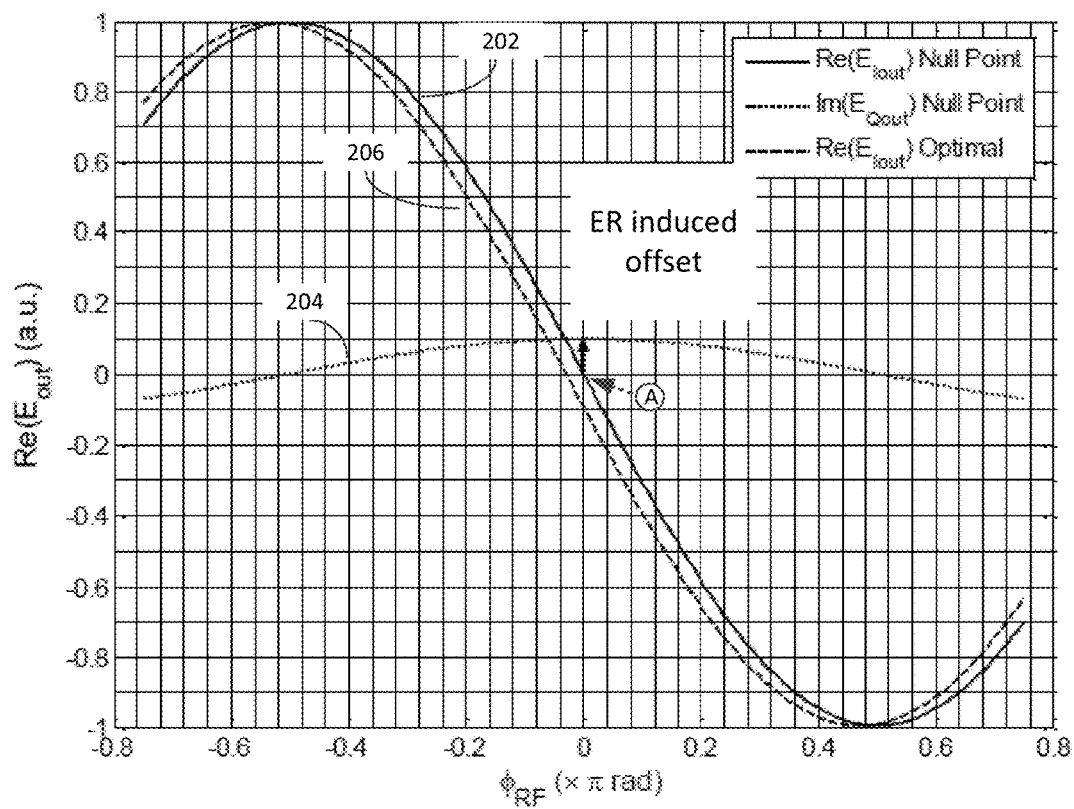
FIG. 2 illustrates a transfer function of an IQ Mach-Zehnder modulator.

FIG. 2 illustrates an example transfer function associated with certain embodiments of the optical modulating device 100. It is noted that the transfer function illustrated in FIG. 2 has a similar shape (e.g., sinusoid) as the power transfer function illustrated in FIG. 1C. Curve 202 illustrates the real component of the electric field $EI_{out}$ that is output from the modulating element 101a as a function of $\phi_{RF\_I}$ (RF data signal), when the optical modulating device 100 is biased at the null point. Curve 204 illustrates the imaginary component of the electric field $EQ_{out}$ that is output from the modulating element 101b as a function of $\phi_{RF\_Q}$ (RF data signal), when the optical modulating device 100 is biased at the null point. The imaginary component of the electric field $EQ_{out}$ would get added to the real component of the electric field $EI_{out}$ at the receiver 107. For example, the power of at point 'A' corresponding to a data signal with level 0 is equal to $|Re(EI_{out})+Im(EQ_{out})|^2$. Without any loss of generality, when the optical modulating device 100 is biased at quadrature, the component $Im(EQ_{out})$ is algebraically added to the component $Re(EI_{out})$ and the component $Im(EI_{out})$ is algebraically added to the component $Re(EQ_{out})$. Referring to curve 202, the real component of the electric field $EI_{out}$ at point 'A' is zero. Accordingly, the power at point 'A' corresponding to a data signal with level 0 would get offset by an amount $|Im(EQ_{out})|^2$ at the receiver 107. This offset could increase the probability of error associated with detecting a symbol represented by a data signal with level 0. The offset is introduced due to coupling between the electric field at the output of the first modulating element and the electric field at the output of the second modulating elements as a result of the modulating elements 101a and 101b having finite ER.

If instead, the optical modulating device 100 is biased a bias point different from the null point such that the real component of $EI_{out}$ is equal and opposite to the imaginary component of $EQ_{out}$, then there would be no offset in the received optical power of a symbol represented by data signal with level 0 at the receiver 107. Referring to FIG. 2, curve 206 illustrates the real component of the electric field $EI_{out}$ that is output from the modulating element 101a as a function of $\phi_{RF\_I}$, when the optical modulating device 100 is biased at a target bias point different from the null point. As noted from FIG. 2, for a symbol represented by a data signal with level 0, the real component of the electric field $EI_{out}$ has a value of -0.1 (a.u.) and the imaginary component of the electric field $EQ_{out}$ has a value of 0.1 (a.u.). At the optical receiver 107, the real component of the electric field $EI_{out}$ would cancel out the imaginary component of the electric field $EQ_{out}$ such that there is no offset in the received optical power for the symbol represented by a data signal with level 0. The systems and methods described herein are configured to provide bias voltages to the modulating elements 101a and 101b such that an offset to the received optical power due to coupling between the electric field at the output of the first modulating element and the electric field at the output of the second modulating elements is reduced or minimized.

Determining a Bias Point Different from the Null Point Using Dither Signal

As discussed above, the electric field $E_{out}$ of the optical signal at the output of the optical modulating device 100 has contributions from the real component of the electric field $EI_{out}$ at the output of the modulating element 101a and the imaginary component of the electric field $EQ_{out}$ at the output of the modulating element 101b. Accordingly, the electric field $E_{out}=EI_{out}-i\ EQ_{out}$. The real component of $E_0$ can be expressed as a function of the maximum output optical power of the modulating element 101a ($PI_{max}$), the minimum output optical power of the modulating element 101b ($PQ_{min}$), the phase difference $\phi_{BI}$ between light propagating through the waveguide 115c and the waveguide 115d when bias voltages BI_P and BI_N are applied to the modulating element 101a and the phase difference $\phi_{BQ}$ between light propagating through the waveguide 115e and the waveguide 115f when bias voltages BQ_P and BQ_N are applied to the modulating element 101b by equation (1), $$Re[E_{out}(\Phi_{BI},\Phi_{BQ})]=\sqrt{PI_{max}}\cos \tfrac{1}{2}\Phi_{BI}+\sqrt{PQ_{min}}\sin \tfrac{1}{2}\Phi_{BQ}. \quad (1)$$

If the modulating elements 101a and 101b are biased at null point, then the real component of $E_{out}$ can be given by equation (2), $$Re[E_{out}(\pi+\Delta\Phi_{BI},\pi+\Delta\Phi_{BQ})]=\sqrt{PI_{max}}\sin \tfrac{1}{2}\Delta\Phi_{BI}+\sqrt{PQ_{min}}\tfrac{1}{2}\Delta\Phi_{BQ}. \quad (2)$$

At the target bias point, the offset introduced due to finite ER of the modulating elements 101a and 101b should be minimized or otherwise reduced. Ideally, the offset introduced due to finite ER of the modulating elements 101a and 101b should be zero, or $Re[E_{out}(\pi+\Delta\Phi_{BI},\pi+\Delta\Phi_{BQ})]=0$.

$$\text{Accordingly, }\sin\tfrac{1}{2}\Delta\Phi_{BI}=-\sqrt{\frac{PQ_{min}}{PI_{max}}}\cos\tfrac{1}{2}\Delta\Phi_{BQ}. \quad (3)$$

If a dither signal is applied to the one or both of the bias voltages BI_P and BI_N, then the power observed at the receiver 107 can be given by the equation below:

$$Re[E_{out}(\Phi_{BI}+\delta\phi,\Phi_{BQ})]^2 \approx \left[\frac{PI_{max}}{2}(1-\cos(\Delta\Phi_{BI}))+\right.$$
$$\left.2\sqrt{PI_{max}PQ_{min}}\sin\left(\tfrac{1}{2}\Delta\Phi_{BI}\right)+PQ_{min}\cos^2\left(\tfrac{1}{2}\Delta\Phi_{BQ}\right)\right]+$$
$$\left[\frac{PI_{max}}{4}\cos(\Delta\Phi_{BI})+\tfrac{1}{2}\sqrt{PI_{max}PQ_{min}}\cos\left(\tfrac{1}{2}\Delta\Phi_{BQ}\right)\sin\left(\tfrac{1}{2}\Delta\Phi_{BI}\right)\right]\delta\phi^2 +$$
$$\left[PI_{max}\sin\left(\tfrac{1}{2}\Delta\Phi_{BI}\right)+\sqrt{PI_{max}PQ_{min}}\cos\left(\tfrac{1}{2}\Delta\Phi_{BQ}\right)\right]\cos\left(\tfrac{1}{2}\Delta\Phi_{BI}\right)\delta\phi,$$

where $\delta\phi$ is the phase change introduced by the dither signal and where the term $[PI_{max}\sin(\tfrac{1}{2}\Delta\Phi_{BI})+\sqrt{PI_{max}PQ_{min}}\cos(\tfrac{1}{2}\Delta\Phi_{BQ})]\cos(\tfrac{1}{2}\Delta\Phi_{BI})\delta\phi$ of the above equation can be referred to as an error signal. The error signal gives the magnitude and/or sign of the response of the modulating element configured as the I-modulator (e.g., modulating element 101a) to the dither signal at the fundamental frequency. In various implementations, the error signal can vary with the same or substantially the same frequency as the dither signal. In various implementations, if the target (e.g., optimal or near optimal) bias point is near the null point, then the target biasing point that satisfies the equation (2) can be achieved by minimizing or otherwise sufficiently reducing the fundamental response to the dither signal.

The above equations provide a basis for finding the target biasing voltages for the modulating element 101a configured as the I-modulator. To find target biasing voltages for both modulating elements 101a and 101b, the offset introduced due to finite ER should be reduced in both the modulating elements 101a and 101b simultaneously.

Ideally when both modulating elements 101a and 101b are biased at the target or optimal biasing points the term $\sqrt{PI_{max}}\sin \tfrac{1}{2}\Delta\Phi_{BI}+\sqrt{PQ_{min}}\cos \tfrac{1}{2}\Delta\Phi_{BQ}=0$ and the term $\sqrt{PQ_{max}}\sin \tfrac{1}{2}\Delta\Phi_{BQ}+\sqrt{PI_{min}}\cos \tfrac{1}{2}\Delta\Phi_{BI}=0$.

These conditions can be satisfied by (i) applying a dither signal to the biasing voltages of a first modulating element (e.g., modulating element 101a) while biasing the second modulating element (e.g., modulating element 101b) at some bias condition and determining the biasing voltages provided to the first modulating element that reduce or minimize the fundamental response of the first modulating element to the dither signal and (ii) then, while holding the first modulating element (e.g., modulating element 101b) at the biasing voltages that reduced or minimized the fundamental response of the first modulating element to the dither signal, applying a dither signal to the biasing voltages of the second modulating element (e.g., modulating element 101b) and determining the biasing voltages provided to the second modulating element that reduce or minimize the fundamental response of the second modulating element to the dither signal. The dither signal applied to the biasing voltages of the first modulating can be the same as the dither signal applied to the biasing voltages of the second modulating element. Alternately, the dither signal applied to the biasing voltages of the first modulating can be different from the dither signal applied to the biasing voltages of the second modulating element.

This process can be repeated several times until the target or optimal bias condition is reached. For example, when implementing this method to determine target or optimal bias voltages for the modulating elements 101a and 101b of the optical modulating device 100, in the $n^{th}$ iteration, the modulating element 101b is biased at the target or optimal bias point determined in the $(n-1)^{th}$ iteration while a dither signal is applied to the biasing voltages of the modulating element 101a and the magnitude of the fundamental response to the dither signal of the modulating element 101a given by the equation (4) below is reduced or minimized.

$$\sqrt{PI_{max}}\sin \tfrac{1}{2}(\Delta\Phi_{BI}[n]+\delta\phi)+\sqrt{PQ_{min}}\cos(\tfrac{1}{2}\Delta\Phi_{BQ}[n-1]) \quad (4)$$

Then the modulating element 101a is held at the current target or optimal biasing point determined in the $n^{th}$ iteration while a dither signal is applied to the biasing voltages of the modulating element 101b and the magnitude of the fundamental response to the dither signal of the modulating element 101b given by equation (5) below is reduced or minimized.

$$\sqrt{PQ_{max}}\sin \tfrac{1}{2}(\Delta\Phi_{BQ}[n]+\delta\phi)+\sqrt{PI_{min}}\cos(\tfrac{1}{2}\Delta\Phi_{BI}[n]) \quad (5)$$

Accordingly, the dither signal can be applied to the first and second modulating elements 101a and 101b in a generally round robin fashion.

FIG. 3 is a flowchart that illustrates an embodiment of a method 300 of determining a target (e.g., optimal or near optimal) biasing point of an optical modulating device (e.g., the optical modulating device 100) such that the offset due to finite ER is minimized or otherwise reduced (e.g., to zero or near zero). The method 300 can be implemented by a bias controller of a modulating device, such as, for example, any of the bias controllers described herein, including the bias controller 109 of the modulating device 100 shown and described with respect to FIG. 1A, and the bias controller 109 shown and described with respect to FIG. 4A.

For the $n^{th}$ iteration, the method 300 comprises holding a first modulating element (e.g., first modulating element 101a) at a first bias voltage ($V^{n-1}_1$) and holding a second modulating element (e.g., second modulating element 101b) at a second bias voltage ($V^{n-1}_2$), as shown in block 302. At startup, when n=1, the first modulating element can be biased at its null point such that $V^0_1 = V_{1\pi}$ and the second modulating element can be biased at its null point such that and $V^0_2 = V_{2\pi}$.

The method 300 further comprises applying a dither signal to the first bias voltage ($V^{n-1}_1$) and determining a modified first bias voltage ($V''_1$) that reduces the magnitude of a first error signal at a receiver at the output of the first and second modulating elements (e.g., receiver 107), as shown in block 304. The first error signal can correspond to the response of the first modulating element to the dither signal at the fundamental frequency given by equation (4) above. The modified first bias voltage ($V''_1$) can be obtained by adjusting the first bias voltage ($V^{n-1}_1$) by an amount equal to the first error signal multiplied by a gain factor, for example. The gain factor can be between about 0.01 and about 10 in some implementations, although other values are possible depending on the embodiment. The gain factor can be selected based on the transfer function of the first modulating element.

The method 300 further comprises changing the bias voltage of the first modulating element to the modified first bias voltage ($V''_1$), as shown in block 308.

In block 310, a dither signal is applied to the second bias voltage ($V^{n-1}_2$) while holding the first modulating element at modified first bias voltage ($V''_1$) and a modified second bias voltage ($V''_2$) is determined that reduces the magnitude of a second error signal at the receiver at the output of the first and second modulating element. The second error signal can correspond to the response of the second modulating element to the dither signal at the fundamental frequency given by equation (5) above.

In various implementations, the modified second bias voltage ($V''_2$) can be obtained by adjusting the second bias voltage ($V^{n-1}_2$) by an amount equal to the second error signal multiplied by a gain factor. In various implementations, the gain factors can be between about 0.01 and about 10 although other values are possible. In various implementations, the gain factor can be selected based on the transfer function of the second modulating element.

The bias voltage of the second modulating element is changed to the modified second bias voltage ($V''_2$), as shown in block 314. The method 300 then proceeds to block 318 where an index n is incremented by 1 and the processes in blocks 304, 308, 310, 314 and 318 are repeated. The method 300 can terminate when the magnitudes of the first error signal and the second error signal are minimized simultaneously thereby determining the target or optimal biasing conditions for both the first and second modulating elements that minimizes or reduces the offset induced by finite ER of the first and second modulating elements. In some implementations, the method 300 can be performed continuously such that the first and second modulating elements are biased at optimal or near optimal bias voltages at all times thereby correcting for drifts in the null points of the first and second modulating elements due to temperature fluctuations or aging.

The target bias voltage can have a value between about 1% to about 10% of the voltage level at the null point, although other values are possible. For example, in an implementation, the target bias voltage is about 6% of the voltage level at the null point.

Example Bias Controller

FIG. 4A illustrates an example implementation of the bias controller 109 that can be employed to generate bias voltages applied to the modulating elements of the optical modulating device using the methods discussed above. The example bias controller 109 includes a plurality of digital-to-analog controllers (DACs) 401a, 401b, 401c and 401d. In various implementations, the DACs 401a and 401b can be a part of a first microcontroller 405a and the DACs 401c and 401d can be a part of a second microcontroller 405b. In the illustrated implementation, the DACs 401a and 401b are configured to generate the DC voltage signal corresponding to the bias voltages BI_P, BI_N, BQ_P and BQ_N. The DACs 401c and 401d are configured to generate the dither signals Ph_P and Ph_N that are applied to the bias voltages BI_P/BI_N and BQ_P/BQ_N in a round robin manner to determine a target (or an optimal) bias point for the modulating elements 101a and 101b such that an offset to the received optical power due to coupling between the electric field at the output of the first modulating element and the electric field at the output of the second modulating elements as a result of finite ER of the modulating elements 101a and 101b is reduced or minimized.

Figure 4B:
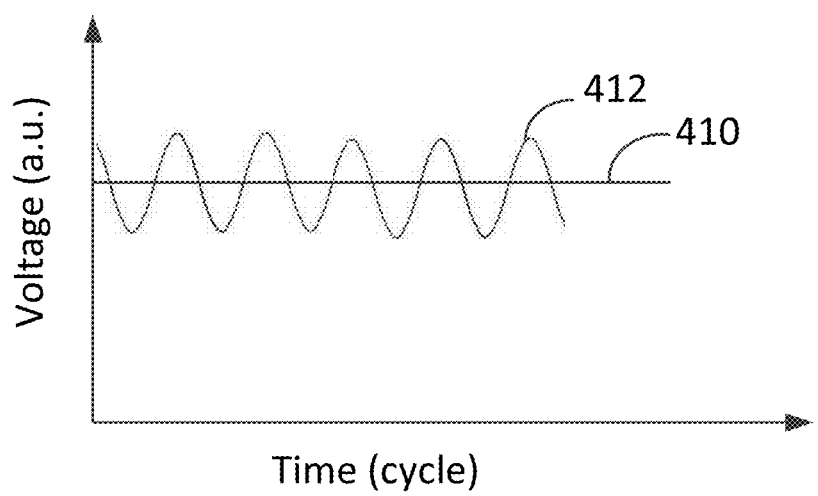
FIG. 4B illustrates an example of a dither signal applied to a DC bias voltage signal.

The dither signal can be a time varying AC signal. The dither signal can be a 20 kHz sinusoidal signal, for example. In various embodiments, the dither signal can be a time varying AC signal (e.g., sinusoidal signal) having a frequency close to the baseband. For example, the dither signal can have a frequency between about 10 kHz and about 20 kHz, between about 20 kHz and about 30 kHz, between about 30 kHz and about 40 kHz, between about 40 kHz and about 50 kHz, between about 50 kHz and about 60 kHz, between about 60 kHz and about 70 kHz, between about 70 kHz and about 80 kHz, between about 80 kHz and about 90 kHz or between about 90 kHz and about 100 kHz. In various implementations, the frequency of the dither signal can be less than or equal to the low frequency cutoff of the transmitter data ports (e.g., the RF electrodes 105a and 105e). In some embodiments, the low frequency cutoff of the transmitter data ports (e.g., the RF electrodes 105a and 105e) can be about 1 MHz. Accordingly, in such embodiments, the dither signal can have a frequency less than or equal to about 1 MHz. For example, in such embodiments, the dither signal can have a frequency between about 10 kHz and about 1 MHz. In other embodiments, higher frequencies are possible, such as where the transmitter data ports have a higher cut-off frequency. For instance, in such cases the dither signal can have a frequency of less than about 1.5, 2, or 3 MHz, frequencies between any of these values, or higher, depending on the embodiment. FIG. 4B illustrates an example of a dither signal 412 applied to a DC bias voltage signal 410. Due to the application of the dither signal, the bias voltages BI_P, BI_N, BQ_P and BQ_N vary between a maximum voltage level and a minimum voltage level at the frequency of the dither signal. A capacitor 407 can be connected to the output of the DAC 401d to generate an AC coupled dither signal that does not have a DC component. In various implementations, the dither signal Ph_P can have the same amplitude but opposite phase to the dither signal Ph_N. In various implementations, the dither signal Ph_P and Ph_N can be single ended. In such implementations, the dither signal Ph_P is applied to the bias voltage BI_P (or BQ_P) and the dither signal Ph_N is applied to the bias voltage BI_N (or BQ_N). In various implementations, the dither signals Ph_P and Ph_N can be differential signals and applied differentially to applied to the bias voltage BI_P (or BQ_P) and the bias voltage BI_N (or BQ_N) simultaneously.

The bias controller 109 is configured to continuously, periodically or intermittently adjust the bias voltage BI_P (or BQ_P) and bias voltage BI_N (or BQ_N) to minimize or otherwise reduce the magnitude of the error signal (or the amplitude of the fundamental response to the dither signal) given by equations (4) and (5) above. In various implementations, the bias voltage BI_P (or BQ_P) and bias voltage BI_N (or BQ_N) can be adjusted by an amount equal to the amplitude of the error signal multiplied by a gain factor. The gain factor is selected such that the bias voltages of the modulating elements approach the target bias voltage levels within a few 100 milliseconds without overshooting the target bias voltages. The gain factor can be associated with the loop gain of a feedback loop included in the bias controller 109. As discussed above, the bias voltage BI_P (or BQ_P) and bias voltage BI_N (or BQ_N) are adjusted iteratively in a round robin manner until the target bias voltages BI_P$_{target}$ (or BQ_P$_{target}$) and BI_N$_{target}$ (or BQ_N$_{target}$) are obtained. The target bias voltages BI_P$_{target}$ (or BQ_P$_{target}$) and BI_N$_{target}$ (or BQ_N$_{target}$) can be within about 1% to about 10% of the bias voltages corresponding to the null point of the modulating elements 101a and 101b.

Operational amplifiers 403a, 403b, 403c, 403d, 403e and 403f can be connected at the outputs of the microcontrollers 405a and 405b to control the voltage levels of the bias voltages BI_P, BI_N, BQ_P, BQ_N and dither signals Ph_P and Ph_N. In certain embodiments, the operational amplifiers 403a-403c are variable gain operational amplifiers. The gain of the operational amplifiers 403a-403c can be adjusted depending on the slope of the transfer function of the modulating elements 101a and 101b and the magnitude of the response of the modulating elements 101a and 101b to the dither signal. The gain of the operational amplifiers 403a-403c can be between 0.01 and 10. For instance, the operational amplifiers 403d-403f can be unity gain operational amplifiers with gain equal to ±1.

The bias controller 109 can be a dynamic controller that automatically adjusts the bias voltages applied to the first and second modulating elements 101a and 101b to reduce magnitude of the error signal. In various implementations, the bias controller 109 can correct for the drift in the null point of the modulating elements 101a and 101b due to temperature changes and/or aging. The bias controller 109 can be a part of a feedback loop that receives a portion of the optical power at the output of the optical modulating device, recovers the error signal close to the baseband that corresponds to the fundamental response of the modulating elements to the dither signal and adjusts the bias voltages to the modulating elements by an amount proportional to the error signal.

Figure 5:
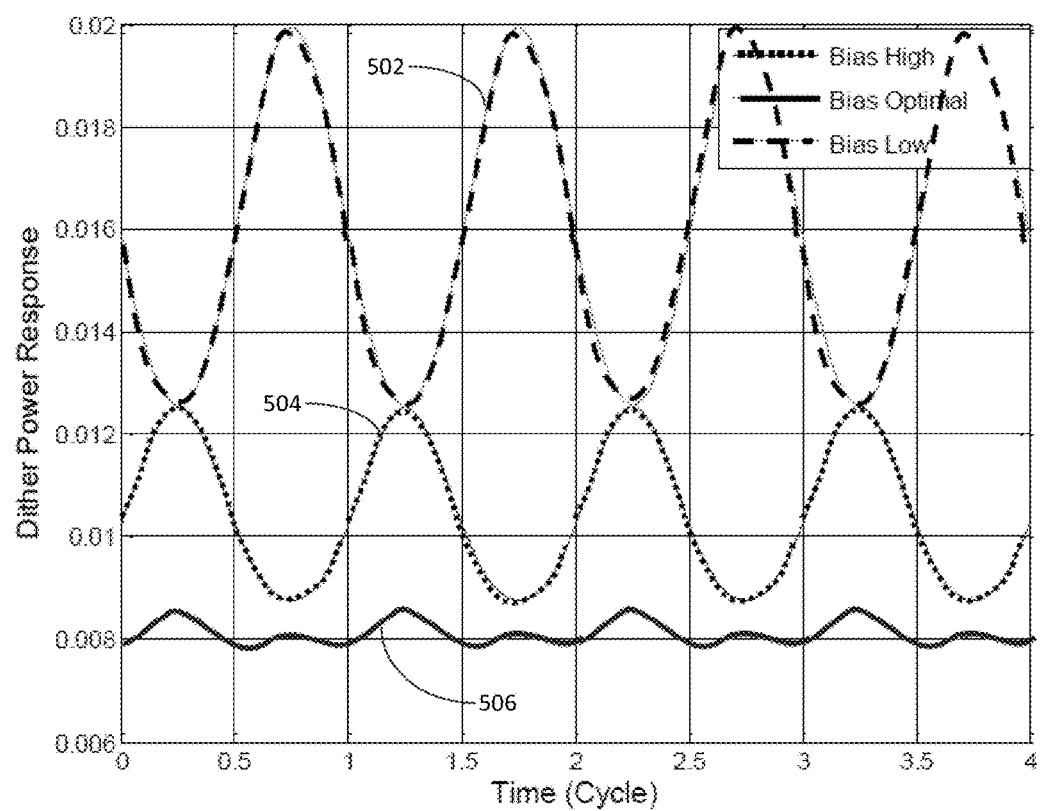
FIG. 5 illustrates the dither power response at the output of the optical modulating device operated at different biasing conditions.

FIG. 5 illustrates the dither power response at the output of an optical modulating device operated at different biasing conditions. Curve 502 shows the dither power response when the optical modulating device is biased at a first bias voltage that is greater than the target or optimal bias voltage. Curve 504 shows the dither power response when the optical modulating device is biased at a second bias voltage that is lower than the target or optimal bias voltage. Curve 506 shows the dither power response when the optical modulating device is biased at a third bias voltage that is at the target or optimal bias voltage. As noted from FIG. 5, when the optical modulating device is biased at a third bias voltage that is at the target (e.g., optimal or near optimal) bias voltage, the dither power response is lower than the dither power response when the optical modulating device is biased at the first bias voltage and the dither power response when the optical modulating device is biased at the second bias voltage.

Figure 6:
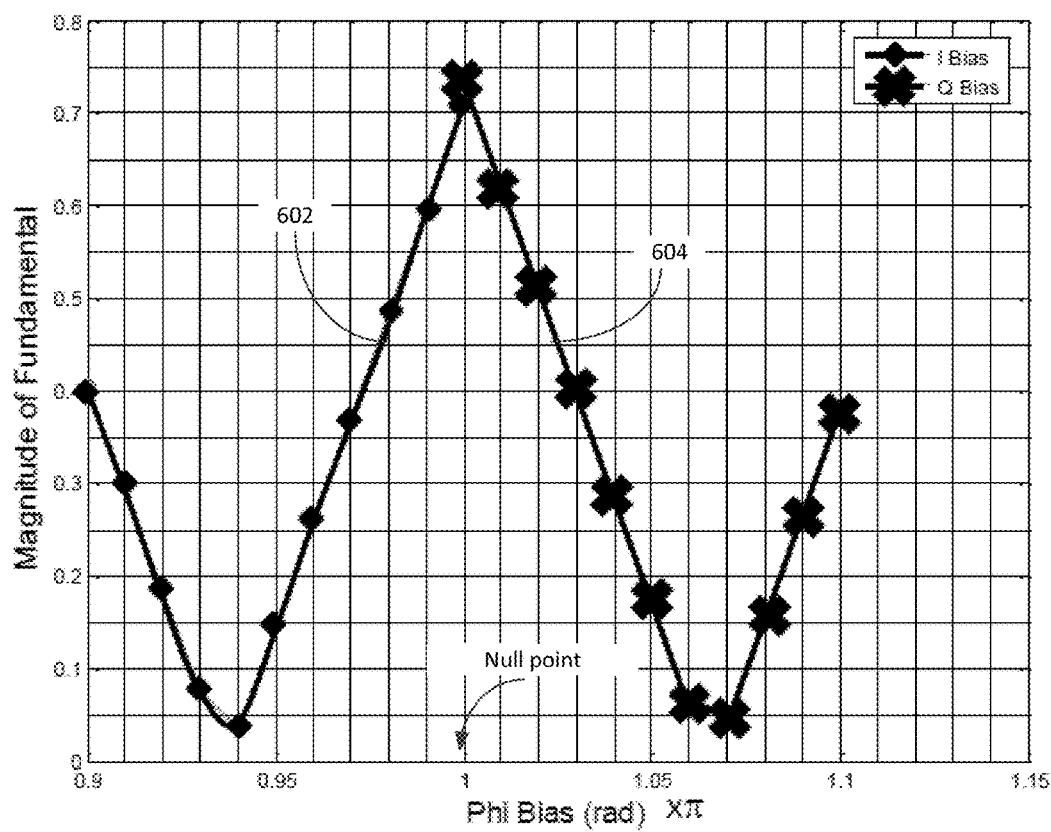
FIG. 6 illustrates the magnitude of the response to the dither signal at the fundamental frequency (also referred to as fundamental response to the dither signal or an error signal) for a first modulating element configured as an I-modulator and a second modulating element configured as a Q-modulator.

FIG. 6 illustrates the magnitude of the response to the dither signal at the fundamental frequency (also referred to as fundamental response to the dither signal or the error signal given by equations (5) and (6) above) for a first modulating element configured as an I-modulator (e.g., modulating element 101a) and a second modulating element configured as a Q-modulator (e.g., modulating element 101b). Curve 602 is the magnitude of the response to the dither signal at the fundamental frequency for the first modulating element configured as an I-modulator (e.g., modulating element 101a) and curve 604 is the magnitude of the response to the dither signal at the fundamental frequency for the second modulating element configured as a Q-modulator (e.g., modulating element 101b). As seen for curves 602 and 604, the magnitude of the response to the dither signal at the fundamental frequency for the first modulating element occurs at a phase shift of about $0.94\pi$ (radians) and magnitude of the response to the dither signal at the fundamental frequency for the second modulating element occurs at a phase shift of about $1.07\pi$ (radians). Thus, the target bias point for the first modulating element is about $0.06\pi$ radians away from the null point and the target bias point for the second modulating element is about $0.07\pi$ radians away from the null point.

Figure 7:
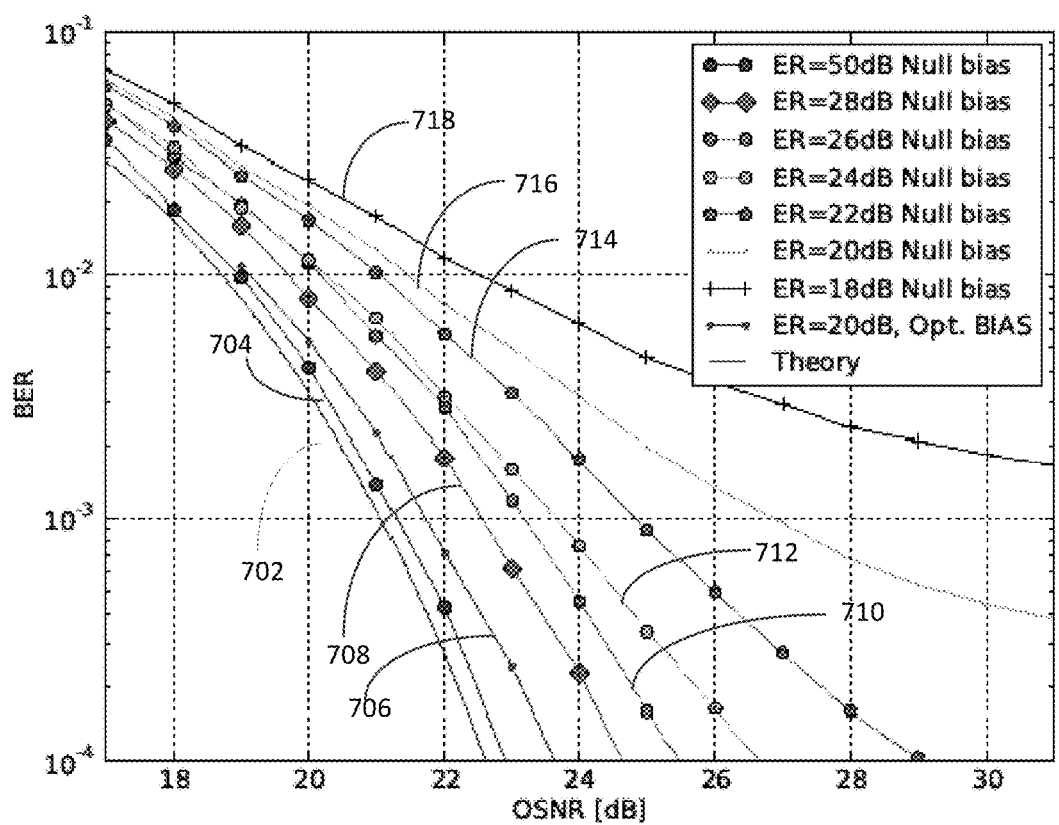
FIG. 7 is a plot of simulated bit-error-rate (BER) curves versus optical signal to noise ratio (OSNR) for optical signals with different extinction ratios generated by the optical modulating device operated at different bias conditions.

FIG. 7 is a plot of simulated bit-error-rate (BER) curves versus optical signal to noise ratio (OSNR) for optical signals with different extinction ratios generated by an optical modulating device (e.g., optical modulating device 100) operated at different bias conditions. The BER curves are obtained by simulating an optical link including an optical modulating device that generates a 16-level Quadrature amplitude modulated (QAM) signal at 32 Gbauds/s. Curve 702 represents the BER curve obtained by theoretical calculations when the optical modulating device is operated at ideal conditions (e.g., biased at null point and the ER is infinite). Curve 704 represents the BER curve obtained when the optical modulating device is biased at a null point and the ER is about 50 dB. Curve 706 represents the BER curve obtained when the optical modulating device is biased at a target or optimal bias point determined by the methods described herein (e.g., method 300) and the ER is about 20 dB. Curve 708 represents the BER curve obtained when the optical modulating device is biased at a null point and the ER is about 28 dB. Curve 710 represents the BER curve obtained when the optical modulating device is biased at a null point and the ER is about 26 dB. Curve 712 represents the BER curve obtained when the optical modulating device is biased at a null point and the ER is about 24 dB. Curve 714 represents the BER curve obtained when the optical modulating device is biased at a null point and the ER is about 22 dB. Curve 716 represents the BER curve obtained when the optical modulating device is biased at a null point and the ER is about 20 dB. Curve 718 represents the BER curve obtained when the optical modulating device is biased at a null point and the ER is about 18 dB.

As expected, when biased at null point, the OSNR required for achieving a certain BER (e.g., $10^{-3}$) increases as the ER decreases from 50 dB to 20 dB. It is further observed that the when biased at null point, the BER for ER less than 20 dB has an error floor and does not reach the value of $10^{-3}$. Comparing the BER curves 706 and 716, it is observed that for optical signals with an ER of 20 dB, the OSNR required to achieve a certain BER for optical signals generated by an optical modulating device that is biased at a target or optimal bias point determined by the methods described herein (e.g., method 300) is about 5-6 dB lower than the OSNR required to achieve a certain BER for optical signals generated by an optical modulating device that is biased at null point. Thus, it can be concluded that optical signals generated by an optical modulating device that is biased at a target or optimal bias point determined by the methods described herein (e.g., method 300) can be reliably transmitted over larger distances than optical signals generated by an optical modulating device that is biased at a null point. It is further noted from FIG. 7 that optical signals having an ER of 20 dB generated by an optical modulating device that is biased at a target or optimal bias point determined by the methods described herein (e.g., method 300) have about the same BER as the optical signals having an ER of 50 dB generated by an optical modulating device that is biased at the null point.

Figure 8:
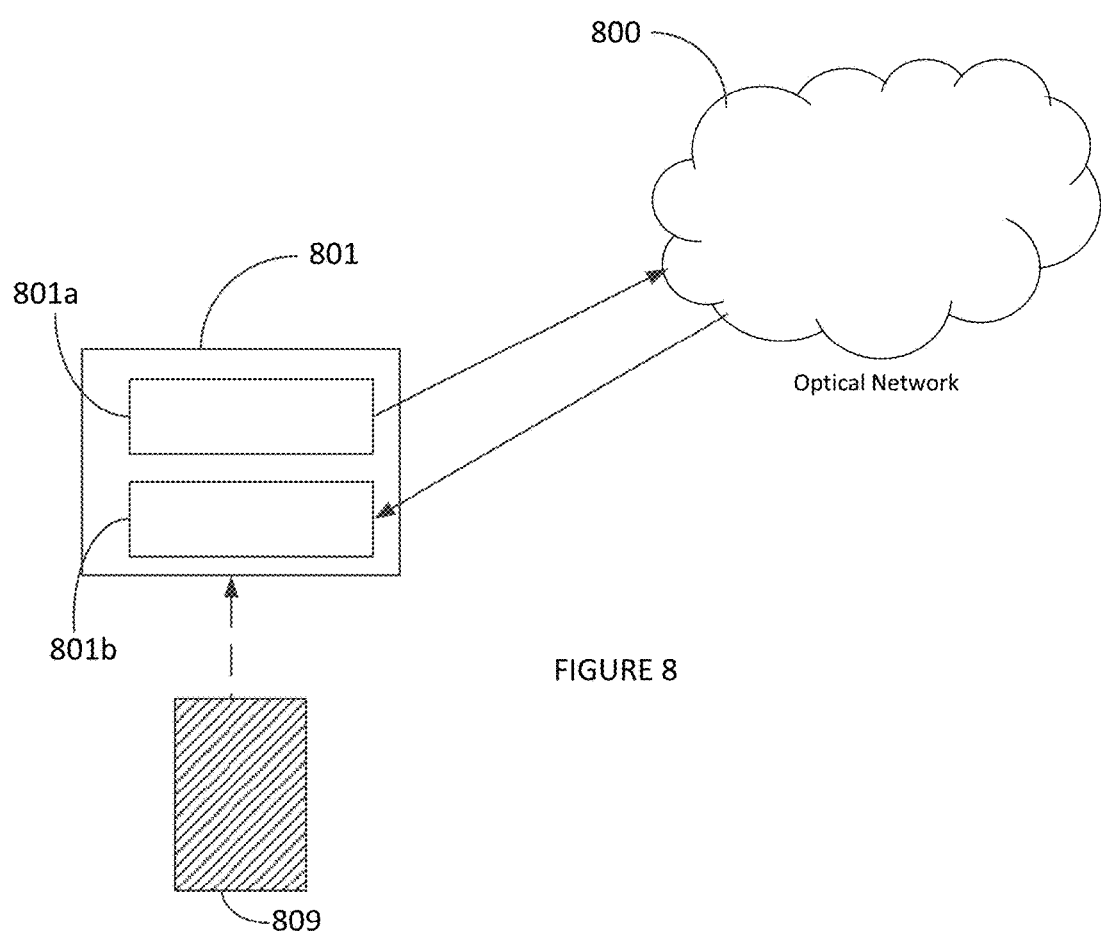
FIG. 8 illustrates an implementation of an optical network.

FIG. 8 illustrates an optical transceiver 801 in communication with an optical network 800. The optical transceiver 801 includes an optical transmitter 801a and an optical receiver 801b. The optical transmitter 801a can be a part of a router, a server, a computer, a phone system, etc. The optical network 800 can be a DWDM network, an OFDM network, a TDM network, etc. In various implementations, the optical transmitter 801a can include an optical modulating device similar to the optical modulating device 100. The bias point of the optical modulating device included in the optical transmitter 801a can be controlled by a bias controller 809 that is similar to the bias controller 109. The bias controller 809 can determine a target bias voltage for the optical modulating device included in the optical transmitter 801a in accordance with the methods (e.g., method 300) described herein. The optical modulating device included in the optical transmitter 801a when biased at the target value by the bias controller 809 can generate spectrally efficient optically signals with advanced modulation formats having an ER greater than 20 dB.

As used herein, a phrase referring to "at least one of" a list of items refers to any combination of those items, including single members. As an example, "at least one of: a, b, or c" is intended to cover: a, b, c, a-b, a-c, b-c, and a-b-c.

This disclosure is directed to various implementations for the purposes of describing certain innovative aspects. However, the teachings herein can be applied in a multitude of different ways. For instance, as will be apparent from the disclosure, the innovative aspects may be implemented in any optical communication system or network. The innovative aspects may be implemented in optical transmitters/transceivers that are configured to generate optical data signals. The innovative aspects may be implemented in optical transmitters/transceivers that are employed in coherent optical communication systems and networks. The innovative aspects may be implemented in optical transmitters/transceivers that are employed in dense wavelengths division multiplexed (DWDM) or optical frequency division multiplexed (OFDM) systems and networks. The innovative aspects may be implemented in optical transmitters/transceivers that are capable of generating spectrally efficient optical signals at relatively high data rates, including data rates of about 1 Gbits/s, about 2.5 Gbits/s, about 10 Gbits/s, about 20 Gbits/s, about 40 Gbits/s, about 100 Gbits/s, or data rates between any of these data rates. In some cases, higher data rates are achieved, such as data rates between about 100 Gbits/s and about 256 Gbits/s. The innovative aspects may be implemented in optical transmitters/transceivers that are configured to transmit and receive data between electronic devices which can include laptops, notebooks, tablets, desktop computers, data centers, gaming devices, data storage systems, input/output peripheral devices, display devices, etc. The innovative aspects may be implemented in or associated with data transport networks, storage area networks, enterprise networks, private networks, secure networks, financial networks, etc. The innovative aspects may be implemented in or associated with systems and devices including optical interconnects. Other uses are also possible.

While embodiments disclosed herein are discussed in relation to a MZM, it is understood that the disclosure is not limited to MZM optical modulators. Instead, systems and methods disclosed herein can be used to provide and/or control bias voltages for a variety of optical modulating devices that have a non-linear transfer function (e.g., sinusoidal transfer function).

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of electronic devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. Storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of processing a signal, the method comprising:
    generating a light beam from a laser configured to generate the light beam;
    receiving the light beam with an optical modulator comprising an input optical waveguide configured to receive the light beam;
    modulating using a plurality of modulating elements configured to modulate the light beam, wherein the plurality of modulating elements comprise a first modulating element having a first null point corresponding to a first level of a first bias signal, and a second modulating element having a second null point corresponding to a second level of a second bias signal; providing a first data signal from a data driver configured to provide the first data signal to the first modulating element;
    providing a second data signal to the second modulating element; and
    adjusting the first bias signal using a bias controller configured to adjust the first bias signal by an amount proportional to a first error signal and adjusting the second bias signal by an amount proportional to a second error signal, wherein the first error signal is responsive to a first dither signal applied to the first bias signal from the first level to a first target level that biases the first modulating element at a first target bias point different from the first null point, and the second error signal is responsive to a second dither signal applied to the second bias signal from the second level to a second target level that biases the second modulating element at a second target bias point different from the second null point, whereupon the adjustment of the first bias signal and the adjustment of the second bias signal reduce electric field coupling between the first modulating element and the second modulating element.

2. The method of claim 1, further comprising receiving the signal with an optical receiver.

3. The method of claim 1, implemented in a router.

4. The method of claim 1, implemented in a server.

5. The method of claim 1, implemented in a switch.

6. The method of claim 1, wherein the data driver is included in a transceiver.

7. The method of claim 1, wherein the first data signal and the second data signal are encoded in a phase-shift keying format.

8. The method of claim 1, wherein the first data signal and the second data signal are encoded in a pulse-amplitude modulation format.

9. The method of claim 1, wherein the first error signal corresponds to the response of the first modulating element to the first dither signal, and the second error signal corresponds to the response of the second modulating element to the second dither signal.

10. A method of processing a signal using an optical transmitter comprising, the method comprising:
    generating a light beam from a laser;
    modulating the light beam based upon a plurality of data signals using an optical modulator comprising a plurality of modulating elements configured to modulate the light beam based on the plurality of data signals, wherein the plurality of modulating elements comprise a first modulating element having a first null point corresponding to a first level of a first bias signal, and a second modulating element having a second null point corresponding to a second level of a second bias signal; and
    adjusting the first bias signal using a bias controller configured to adjust the first bias signal by an amount proportional to a first error signal and adjusting the second bias signal by an amount proportional to a second error signal, wherein the first error signal is responsive to a first dither signal applied to the first bias signal from the first level to a first target level that biases the first modulating element at a first target bias point different from the first null point, and the second error signal is responsive to a second dither signal applied to the second bias signal from the second level to a second target level that biases the second modulating element at a second target bias point different from the second null point, wherein the adjustment of the first bias signal and the adjustment of the second bias signal reduce electric field coupling between the first modulating element and the second modulating element.

11. A method of processing a signal, using an optical communication system, the method comprising:
   generating a light beam using a laser;
   receiving the light beam using an optical modulator comprising an input optical waveguide configured to receive the light beam, a first modulating element configured to receive a first bias signal and to generate a first modulated optical signal based on modulating the light beam with a first data signal, a second modulating element configured to receive a second bias signal and to generate a second modulated optical signal based on modulating the light beam with a second data signal, and an output waveguide configured to generate an output optical signal based on combining the first modulated optical signal and the second modulated optical signal;
   generating the first data signal and the second data signal using a data driver; and
   controlling the first bias signal using a bias controller configured to control the first bias signal to a first bias voltage;
   controlling the second bias signal to a second bias voltage;
   adjusting the second bias voltage to a modified second bias voltage based on applying a first dither signal to the first bias voltage, wherein the bias controller is operable to control the first bias signal and the second bias signal to reduce electric field coupling between the first modulating element and the second modulating element.

12. The method of claim 11, wherein the data driver is included in a transceiver.

13. The method of claim 11, further comprising receiving the signal with an optical receiver.

14. The method of claim 11, implemented in a router.

15. The method of claim 11, implemented in a server.

16. The method of claim 11, implemented in a switch.

17. The method of claim 11, wherein the first data signal and the second data signal are encoded in a phase-shift keying format.

18. The method of claim 11, wherein the first data signal and the second data signal are encoded in a pulse-amplitude modulation format.

19. The method of claim 11, wherein the bias controller is further configured to change the second bias signal to the modified second bias voltage, and to adjust the first bias voltage to a modified first bias voltage based on applying a second dither signal to the modified second bias voltage.

20. The method of claim 11, wherein the bias controller comprises a first digital-to-analog converter (DAC) configured to generate the first bias voltage, and a second DAC configured to generate the second bias voltage.

* * * * *